United States Patent [19]

Wright

[11] Patent Number: 5,481,864
[45] Date of Patent: Jan. 9, 1996

[54] CLOTH SCRAP RECYCLING METHOD

[76] Inventor: Herbert J. Wright, Rte. 4, Box 886, Decatur, Tex. 76324

[21] Appl. No.: 273,336

[22] Filed: Jul. 11, 1994

[51] Int. Cl.⁶ .............................. D01H 4/00; D01G 13/00
[52] U.S. Cl. ................ 57/400; 57/252; 19/107; 19/145.5
[58] Field of Search .................. 241/15, 16, 38, 241/301; 19/107, 65 A, 144, 145, 145.5, 297, 303, 98, 115 B, 48 R, 39, 66; 57/400, 401, 404, 252

[56] References Cited

U.S. PATENT DOCUMENTS

| | | |
|---|---|---|
| 1,889,615 | 11/1932 | Schersch ................................. 19/65 A |
| 4,100,725 | 7/1978 | Magel . |
| 4,115,992 | 9/1978 | Van Tijn . |
| 4,244,173 | 1/1981 | Lulay . |
| 4,300,267 | 11/1981 | Winch et al. ............................. 19/200 |
| 4,301,573 | 11/1981 | Gunter et al. ............................ 19/200 |
| 4,517,715 | 5/1985 | Yoshida et al. . |
| 4,533,507 | 8/1985 | Tao ........................................... 241/38 |
| 4,914,787 | 5/1990 | Leifeld et al. ........................... 19/145 |

*Primary Examiner*—C. D. Crowder
*Assistant Examiner*—Larry D. Worrell, Jr.
*Attorney, Agent, or Firm*—Hardaway Law Firm

[57] ABSTRACT

A method for producing high quality fabrics using recycled fabric scraps is disclosed. By use of pre-gin contacting of the virgin carrier fibers as well as moistening the fiber scraps that are recycled, fiber length and fiber uniformity percentages are maintained higher then typically achieved by the prior art. The process has many advantages such as: the need for redyeing the resulting material is minimized and shrinkage is substantially reduced.

15 Claims, 2 Drawing Sheets

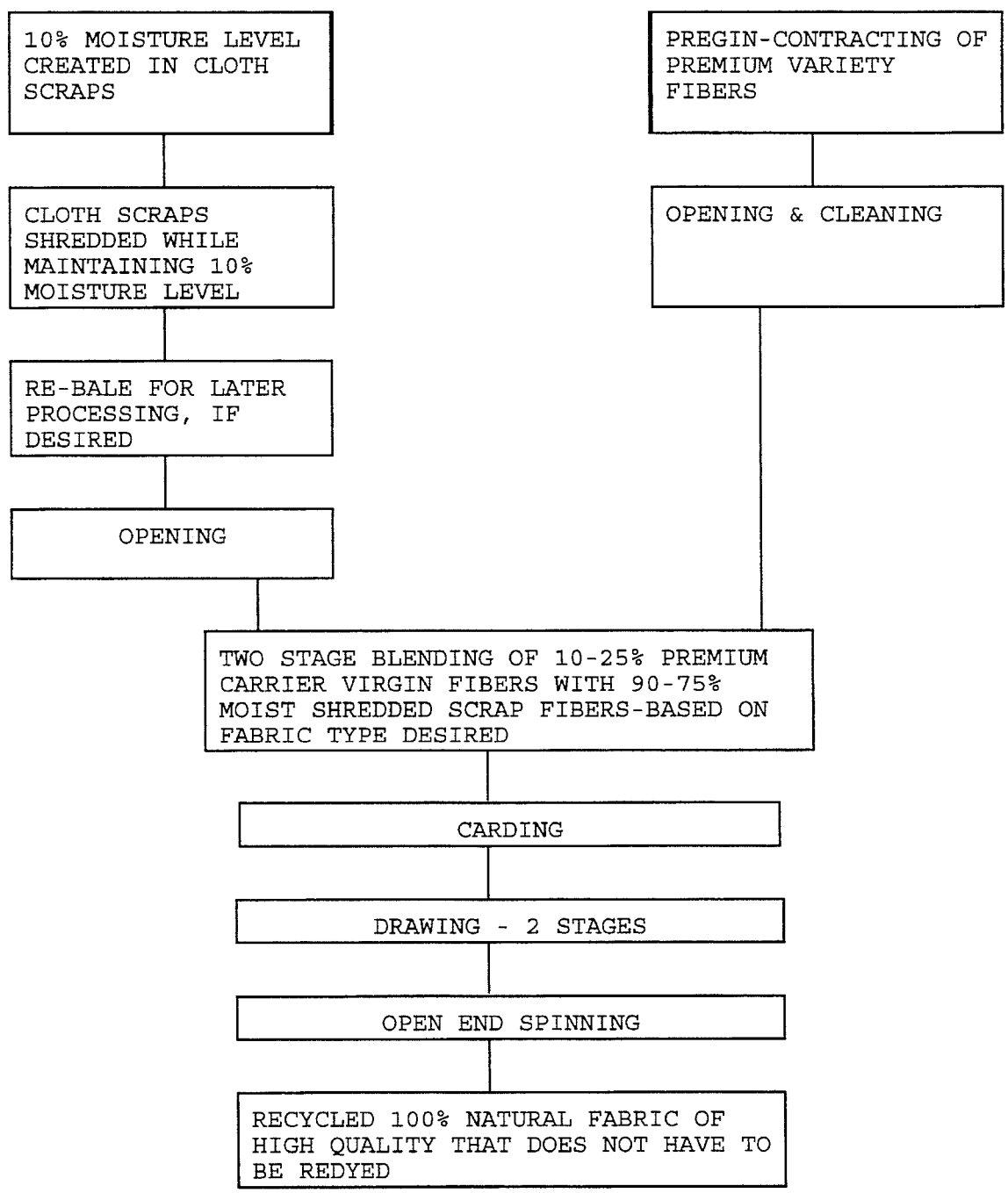

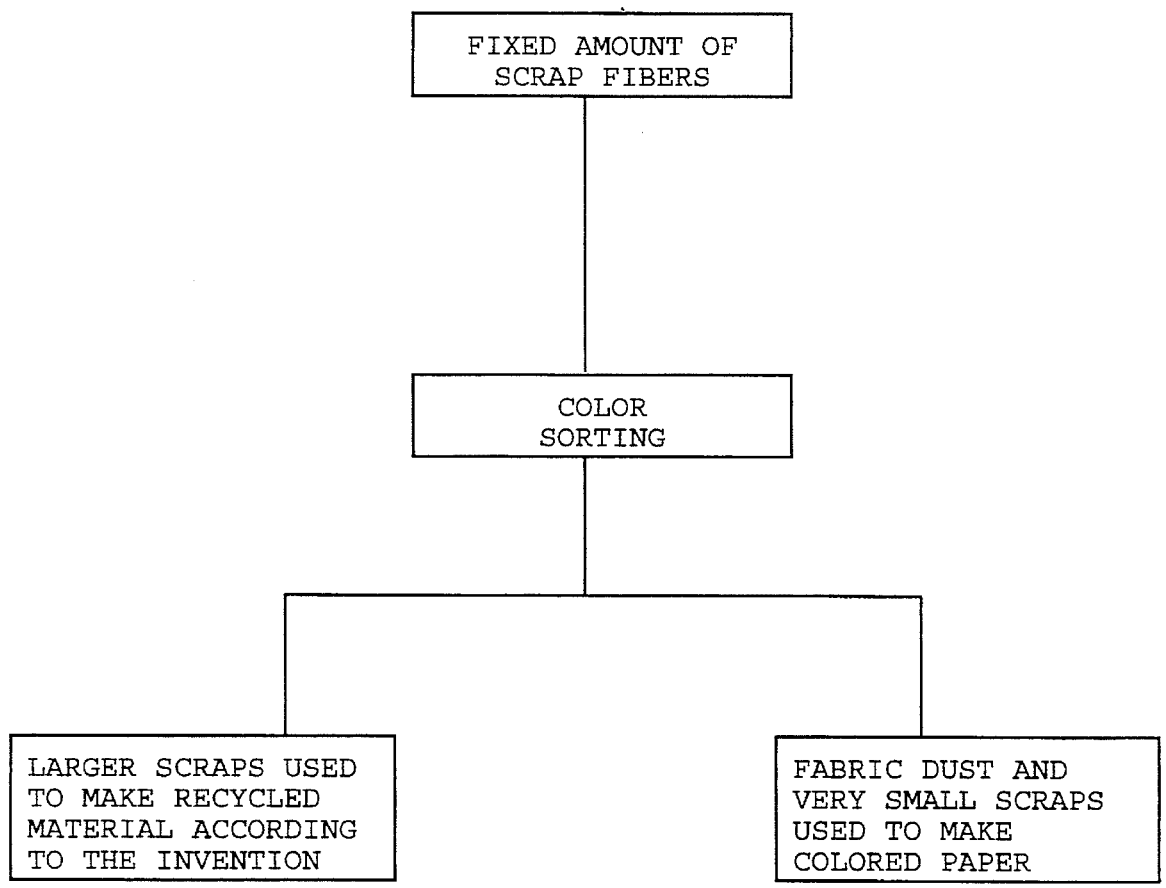

CLOTH SCRAP RECYCLING METHOD

DESCRIPTION OF THE PRIOR ART

Large amounts of cloth scrap, clippings, and loose sample scraps are created at cutting and sewing plants where garments are manufactured. These scraps are waste material and make up approximately 15–30% of all types of fabric manufactured for use in the garments. Unless recycled into insulating materials or nonwoven matting, these cloth scraps and clippings become waste and eventually get dumped in landfills. With today's environmental concerns, this is unacceptable.

Therefore, according to the prior art, methods of recycling cloth scraps have been attempted. These methods involve using either: (1) high percentages of virgin, i.e., not waste, carrier fibers or (2) non-biodegradable synthetic fibers. These two prior art methods are not efficient. First, by using high percentages of virgin fibers, typically in excess of 50%, costs are greatly increased and the amount of scrap fibers actually recycled is low because the resulting fabric is primarily virgin fabric. Also, the resulting fabric must be re-dyed to the required color since the large amount of virgin carrier fabric required dilutes the color of the recycled scrap material. This is especially a problem when recycling denim because denim must be over-coat dyed with indigo, the only organic natural dye and, therefore, has a higher cost. Second, although non-biodegradable synthetic fibers are easily accessible, they implicate serious environmental and cost concerns. These synthetic fibers also lack the ability to retain dyes as effectively as natural fibers and because of their slick surfaces do not bond well with other fibers. Furthermore, the resulting fabric does not have the texture, quality, and comfort, as well as the label value that premium natural fibers do.

Therefore, a method of recycling fibers that produces ECO-type fabrics is needed. "ECO-type fabric" is a term adopted by the textile and garment industry and taken from the term "ecology." ECO-type fabrics display environmental-friendly impressions of fabric products such as chemicals, dyes, and natural fibers and are more comfortable than materials made from synthetic fibers.

Furthermore, according to the prior art, it has not been known to recycle an entire amount of cloth scraps into other biodegradable products. For example, to date, there has only been limited recycling of the dust collected in the filter bags of various fabric treating machinery, such as shredders and cleaners. Only when the material has been denim (non-cotton) dyed with indigo has this been attempted. This was the case because this was the primary material dealt with by the manufacturer. This dust, which is really just dry powdered indigo, was then conventionally mixed with paper pulp to make indigo colored paper. This prior art method, however, failed to recognize the improvements possible by color sorting and using 100% cotton scraps to make colored papers of various colors and quality as well as using larger scraps to make new recycled cloth materials.

Thus, great room for improvement within the art exists because there has been no way to effectively and efficiently recycle an entire amount of cloth scraps—into fabrics of all types, as well as other non-bio-degradable products, such as paper.

SUMMARY OF THE INVENTION

The process for recycling cloth scraps according to the invention allows for yarn production of high quality 100% natural fibers. The process eliminates the need for high percentages of virgin fibers, non-biodegradable synthetic fibers, and redyeing of the resulting recycled yarn. Therefore, the process according to the invention greatly reduces the costs of the resulting yarn while increasing its quality. As an unexpected by-product of the process according to the invention, it has also been found that long fibered materials such as wool or cut mohair—which have been uniformly ring spun—can be successfully open-end spun.

OBJECTS OF THE INVENTION

It is an object of the invention to have a process for recycling both scraps that is cost effective, yet produces yarns of the highest possible quality.

It is a further object of the invention to have a process for recycling cloth scraps into yarn that uses only bio-degradable fibers and minimal amounts of virgin carrier fibers.

It is a further object of the invention to have a process for recycling cloth scraps that uses only standard manufacturing equipment.

It is a further object of the invention to have a process for recycling cloth scraps that results in a yarn requiring no redyeing.

It is a further object of the invention to have a process for recycling cloth scraps that results in absolutely no waste material that cannot be used for some purpose It is a further object of the invention to have a process for recycling cloth into yarns in which long virgin fibers can be spun around short scrap fibers by the use of open-end spinning.

It is a further object of the invention to produce a premium labeled ECO-type fabric using the recycled cloth scraps.

It is a further object of the invention to have a process for making colored paper using colored cloth scraps.

These and other objects of the invention are achieved by a process for recycling cloth scraps comprising the steps of: moistening cloth scraps, placing the moist cloth scraps into a shredding machine; applying moisture to the scraps while they are shredded by the shredding machine; opening the shredded scrap into scrap fibers; selecting premium variety virgin cotton fibers; pregin contracting these premium variety virgin fibers; opening and cleaning the premium variety virgin fibers; and blending, carding, drawing, and spinning 10–25% virgin fibers around 90–75% scrap fibers.

BRIEF DESCRIPTION OF THE DRAWINGS

FIG. 1 represents a flow chart showing the steps of the process for recycling cloth scraps according to the invention.

FIG. 2 represents a simplified flow chart showing how all the cloth scraps contained in a given volume can be recycled leaving absolutely no waste.

DETAILED DESCRIPTION OF THE DRAWINGS

Background

Two themes that constantly reoccur at each step of the method according to the invention are the maintenance of long fiber lengths and the production of high fiber uniformity percentages. Therefore, before describing the method of recycling cloth scraps according to the invention, it is important to describe why these two themes are so important.

Fiber length maintenance is important when considering the details of the spinning process. During most types of spinning processes, long carrier fibers are wrapped, i.e., "spun", around short scrap fibers at high speeds. Therefore, the longer the carrier fibers, the tighter the short scrap fibers will be held together. This results in a stronger yarn. Furthermore, because longer carrier fibers can hold together more short scrap fibers, less carrier material is required. Moreover, the shredding process to which the scraps are subjected, causes the scrap fibers to be inherently shorter than the carrier fibers. It still is, however, desirable to have the scrap fibers as long as possible also. Having longer short scrap fibers is important because they have more surface around which the long carrier fibers can be spun. Thus, it is important to maintain all fibers with the longest possible length. This has not been applied to open-end spinning, however. In open-end spinning, short fibers have been spun around short fibers.

While fiber length maintenance is important for the reasons set forth above, it also needs to be noted that fiber length maintenance is important because the price of cotton increases with fiber length. Therefore, cotton costs increase because longer fibered cotton than necessary must be purchased, at this higher cost, to make up for fiber length that is lost during the various stages of the material making process, e.g., shredding and cleaning. Thus, if it is possible to keep fiber length loss at a minimum, it is possible to greatly reduce raw material costs.

Fiber uniformity percentage is the measure of the uniformity of fiber lengths in a sample expressed as a percentage. This is also important. Simply, if long fiber length, in general, is important, then having a high percentage of the fibers of long length is important. According to prior art shredding and ginning processes, fiber uniformity percentages are typically in the range of the low 70%'s (all fiber uniformity percentages disclosed in this application are based on Fibergraph testing method times 2). A fiber uniformity percentage in the low 70%'s is considered by the USDA to be "slightly irregular" According to the method of the invention, however, fiber uniformity percentages in the high 80%'s are achieved. Fiber uniformity percentages in the high 80%'s are considered by the USDA to be "uniform." The invention, therefore, because it produces a uniform product, produces much stronger yarns and fabrics made of these yarns.

Finally, pre-gin contracting also affects fiber length and fiber uniformity percentages and is, therefore, important to the method according to the invention. Pre-gin contracting is the buyer's right to have the virgin material such as cotton ginned to certain specifications, for example: reducing over-drying, controlling moisture at certain stages of the ginning, and eliminating entire stages of certain types of lint cleaning machines. These steps, if present, can damage fiber quality. By eliminating these steps, at least 1/16" of fiber length is preserved and better uniformity percentages are achieved. For example, typically, according to the prior art, virgin carrier materials are lint cleaned by using two high speed saw tooth cylinders and grid bar cleaners rotating at between 1400–1600 RPM. While some cylinders have air jet cleaners, most do not. Also, most gins over-dry the cotton by reducing the moisture level to about 4–5%. This causes the saw cylinders and bar cleaners to excessively damage the fibers. It will be shown, below, how by pre-gin contracting, this damage is reduced.

The Process

Figure One sets out, in skeleton form, the method of recycling cloth scraps according to the invention. In this process:

1. Raw materials in the form of cloth scraps are placed into a shredding machine and have moisture applied thereto;
2. The moist shredded scrap material is then opened into scrap fibers;
3. Premium variety virgin cotton fibers are selected;
4. These premium variety fibers are pre-gin contracted;
5. After being pre-gin contracted, the premium variety fibers are opened and cleaned; and
6. Next, depending on the type of resulting fiber desired, 10–25% virgin fibers are blended, carded, drawn, and spun with 90–75% scrap fibers.

While this process may seem very simple, each individual step significantly adds to the quality of the resulting recycled fabric. Therefore, each step and what it achieves will be described in detail.

STEP 1: Raw materials in the form of cloth scraps are placed into a shredding machine and have moisture applied thereto.

While the raw material can be any type of scrap material and across a wide range of fiber lengths, the process works exceptionally well with scrap materials such as: cotton, denim, wool, cut mohair, and naturally colored earth and animal fibers such as: Alpaca, cashmere, colored wool, naturally genetically colored cotton, and llama wool. Denim, however, because of its short fibers and high degree of twist that make its fibers very hard to open, is the hardest material to recycle. As the instant process works with denim, the hardest material to recycle, the process can easily be applied to long fibered materials such as wool and cut mohair.

At this point, the scrap materials will have been sorted according to color. Then, prior to shredding, the raw material is stored in a room having a relative humidity in the range of 65–70%, at atmospheric conditions, for enough time to achieve an actual moisture content in the scrap material of approximately 10%. The prior art has usually used a relative humidity of about 55–60%. Moisture prevents heat buildup from friction created by the shredding machine's pin-type cylinders. These cylinders shred the cloth scraps back into their fiber stage. For maximum effect, this moisture level percentage is maintained from the beginning to the end of the shredding process by applying a direct moisture spray inside the shredding machine. If this heat buildup was not prevented, the resulting scrap fibers would dry out. This is not acceptable because dry fibers are weaker since dry conditions reduce both fiber lengths and fiber uniformity percentages.

While typically it is expected that the moist shredded scrap material will be applied to the next step in the process, it is also conceived that the moist shredded scrap material can be rebaled and stored for later use.

Finally, by moisture conditioning, fiber lengths according to the invention are maintained at a minimum of 3/4"–29/32". Prior art shredding and garnetting processes produce fibers that are shorter; typically no more than 1/2". Furthermore, moisture conditioning minimizes the loss of waste material.

Table One shows the effect of moisture conditioning verses conventional prior art dry processing.

TABLE ONE

| Scrap Fibers | Fiber Length | PSI Strength | Uniformity Percentage | Strength of spun yarn, in break points, measured by the skein method. [Yarn count – Fiber strength] | Increase in Strength of spun fiber |
| --- | --- | --- | --- | --- | --- |
| Dry [prior art] | ¼"–½" | High 70,000 | Low 70% | 600 points below moist | N/A |
| Moist, [invention] | ¾"–²⁹⁄₃₂" | Low to mid 80,000 | Mid 80% | 6 – 2247<br>10 – 2088<br>18 – 1576 | 600 Break points |

A PSI strength in the high 70,000's is considered by the USDA to be "fair" while a PSI strength in the low to mid 80,000's is considered to be "Average."

STEP 2: These moist shredded scrap materials are subjected to an opening process.

This step is conventional.

STEP 3: Premium virgin cotton fibers are selected.

Because fiber length is so important to the invention, the use of certain premium seed varieties as carrier fibers are preferred. By use of "premium", that means seed varieties producing fibers of the longest possible length and, therefore, have the highest costs. These premium seed varieties will usually be: Acala, American Egypt, and Pima. Furthermore, it is possible for the carrier fibers to comprise a blend of: an animal wool, such as Alpaca or Mohair; silk; and one of the premium seed varieties described above. The Acala, American Egypt, and Pima varieties are far superior in strength and fiber length than all other fiber producing seed varieties. For example, with Acala, the minimum PSI strength is 100,000 PSI and fiber lengths, after custom ginning are 1 ¹⁷⁄₃₂". Fiber lengths for American Egypt and Pima, also after custom ginning can be in excess of 1 ½". Thus, with a 50–50 blend of American Egypt and Acala as the carrier material, for example, both strength and fiber length is maintained over prior art carrier fibers such as the numerous upland or rain grown varieties. Table Two shows the characteristics of various carrier seed varieties

TABLE TWO

| Carrier Seed Variety | Fiber Length | PSI Strength | Fiber Uniformity Percentage (Based on Fibergraph testing × 2) | Cost per lb. |
| --- | --- | --- | --- | --- |
| Acala | 1 ⁷⁄₃₂" | 100,00–110,000 | 86–90% | $0.60 to $0.70 |
| American Egypt (roller ginned) | >= 1 ½" | 110,000–130,000 | 90% | $0.50 to $1.00 |
| Pima (roller ginned) | >= 1 ½" | 110,000–130,000 | 90% | $0.50 |
| Prior art carrier fiber varieties [upland or rain grown varieties] (cleaned with saw tooth cylinders) | ³¹⁄₃₂"–1 ¹⁄₁₆" | High 70,000 to Low 80,000 | High 70% to Low 80% | $0.50 |

While it is true that, depending on the seed grade and fiber length, the cost of using premium grade seed can be as much as twice as using prior art varieties, the improvement in uniformity percentages and fiber length far outweighs any cost concerns. Because of the increased fiber lengths of these premium carrier fibers, as described above, much less carrier fibers are required. Therefore, cost of the carrier material is not that much of a factor.

Also, by using smaller amounts of carrier fibers, the original colors from the original dyes, of the scrap material are not diluted and better shades of color are maintained. For example, if the scrap materials are blue, as typically is the case with denim dyed by indigo, and the virgin carrier material is white, the more white virgin carrier material added, the less the blue color of the scrap materials will stand out. The blue color becomes diluted. Therefore, in order to have a blue final product, it must be dyed blue using expensive indigo dye. With the final product according to the method of the invention, no dyeing is required because less white virgin carrier fibers are added. This lowers the cost of recycling fibers. This allows the ability to create a naturally dyed chambray (a dyed warp-yarn in which the fibers run parallel to the length of the loom) and a naturally dyed filling (a dyed warp material in which the fibers run parallel to the width of the loom).

STEP 4: These premium variety fibers are pre-gin contracted.

USDA cotton loan pricing regulations place a premium on "leaf grade" value cotton which emphasizes cleanliness of the fibers. Accordingly, the USDA regulations encourage over-drying and overcleaning in order to meet this grade. As described above, carrier fibers typically ginned according to prior art methods, in order to meet these USDA regulations, have reduced fiber lengths and fiber uniformity percentages. However, since the USDA regulations are not a factor in the method according to the invention because so little virgin cotton is used in combination with the large amount of waste material that the cleanliness of the carrier fibers has no effect on the recycled material, the carrier fibers (cotton) can be pre-gin contracted to non-USDA specifications. For example, according to the invention, only one saw/grid bar cleaner, rather than two, can be used and its speed reduced to 800 RPM. Furthermore, the moisture content is never brought below substantially 8%. Therefore, fiber lengths and fiber uniformity percentages are maintained because of, for example, the reduction in over-drying.

STEP 5: After being pre-gin contracted, the premium variety fibers are opened and cleaned.

These steps are conventional.

STEP 6: Depending on the type of resulting fiber desired, 10–25% virgin fibers are blended, carded, drawn, and spun with 90–75% scrap fibers.

This step creates the resulting recycled material.

Blending is achieved by the use of two blending stages. Extra blending is especially important in the case of coarse yarns in which the second stage of drawing is omitted. The blending process, per se, which uses stand-type blenders, is conventional.

By use of colored scrap materials in combination with naturally colored wool and cotton materials, such as Alpaca and cashmere, as virgin carrier fibers, it is also possible to make "heathered" fabrics without any further dying. Heathered fabrics are fabrics of one main color with speckles of another mixed in, for example, tweeds. Therefore, according to the process, the main color would be that of the scrap material and the speckles would be the color of the virgin carrier fibers. This allows for an unlimited number of blends to be created depending on the selection of the color of the cloth scraps and the color of the virgin carrier fibers.

The carding and drawing stages are also conventional. During the carding process, the blended mixture of fibers is passed between opposing layers of wire teeth. This untangles and aligns all the fibers, forming a sliver. At this point, the recycled material contains approximately 2% unshredded thread material. This blended material, after some short fibers that could not be re-opened are removed at the carding point, delivers clean and even sliver. I have found that by treating the raw materials in accordance with step one of the disclosed process, I have been able to reduce the amount of thread that is wasted, i.e., not re-opened. According to the prior art, the amount of thread that can not be re-opened is usually in the range of 15-20%. However, I have found that by treating the raw materials in accordance with step one of the disclosed process, I have been able to reduce the amount of thread that cannot be re-opened to about 3%. This greatly reduces the amount of fiber that cannot be recycled.

Next, drawing is also achieved by using two drawing stages. During drawing, a number of slivers are drawn and combined into a single, stronger, sliver. Two drawing stages are preferred because it produces superior color and fiber blending.

The amount of virgin carrier fiber used in relation to the amount of scrap fibers used depends upon the type of yarn being made. For example, in weave yarns, the carrier fiber percentage in a fiber blend would typically be 25%, with a maximum of 30%, with recycled fibers making up the balance. In knit yarns, where less strength is required relative to yarn size, the percentage of carrier fiber used would be reduced to as low as 10%, with the remainder being recycled fibers. When non-premium seed varieties are used, regardless of the type of yarn being made, a higher percentage of carrier fiber must be used; a minimum amount being about 50%. This is not cost effective because color cannot be maintained, and redyeing of the yarn is required.

Finally, the finished slivers are spun together to form the resulting recycled material. Typically, the resulting recycled material is made by the use of open-end spinning machines. To date there has only been one attempt to open-end spin long fibers around short fibers, as is the practice in other types of spinning. There have not been more attempts because open-end spinning was specifically designed and created for the spinning of shorter fibers of uniform length only. The one attempt to open-end spin long fibers around short fibers was carried out some years ago at Texas Tech University. It was attempted to open-end spin a cotton wool blend. The blend consisted of 75% cotton (upland varieties) and 25% wool and is known under the trademark TEXALANA. This blend is, however, very weak. The weakness stems from, in part, the short fiber lengths and weaknesses inherent to the upland varieties of cotton and the lack of pre-gin contracting. This weakness results in TEXALANA being not useful in most situations. Even when they substituted the highest quality Pima cotton for the upland varieties, because the researchers at Texas Tech University did not use pre-gin contracting or moisture treatments, they could only reduce the amount of cotton needed by 10% to 65% Pima cotton and 35% wool, while still not achieving any substantial gains in strength. Based on these Texas Tech experiments, those skilled in the art did not believe it was possible to successfully open-end spin long fibered materials around short fibered materials. Furthermore, it was never attempted to open-end spin recycled cloth scraps.

Accordingly, most long fibered materials such as wool and mohair have been traditionally spun only by ring spinning. However, the open-end spinning process itself does not preclude or set any upper limit on the length of fiber which can be open-end spun. Therefore, according to the invention, it was attempted to open end spin long fibered premium cottons, for example, Acala, American Egypt, and Pima, which have been pre-gin contracted, around the shorter scrap fibers of, for example, denim, wool, or cut mohair, which have been moisture treated. The attempt was successful. Accordingly, it has been found that a much stronger material can be made by the open-end spinning process because longer fibers—one of the keys to strong fibers—can be successfully used in open-end spinning.

OTHER BENEFITS OF PROCESS

It should be noted that if a type of spinning, other than open-end spinning is used, for example, ring spinning, the slivers will have to be placed through the roving process prior to any actual spinning.

In order to successfully bond short fibers around short fibers it is required that a high degree of twist is applied during the spinning process. Twist ratios in the range of 4.7–5.0 twists per inch are common in the prior art. This typically results in hard yarns that are uncomfortable to wear.

In the instant process, despite the application of the usual high degree of twist, soft, bulky yarns that are comfortable to wear result. This is a direct result of the fact that long fibers are being spun and twisted around the short fibers. Accordingly, the maximum twist is actually being applied to the long fibers and not the short fibers as in the prior art. This results in a strong yarn that still has the high quality required to make wearing apparel. This result has not been expected by those skilled in the art.

As it was described above that it was not thought to be possible to open-end spin long fibers around short fibers, this benefit to the art of open-end spinning is unexpected to those of ordinary skill in the art.

The process according to the invention also greatly reduces material shrinkage. Shrinkage typically occurs after the desizing shrinking process. The desizing shrinking process is needed to remove the starch added to the material during the slashing, or sizing process. The slashing (sizing) process is used to strengthen fibers, for better weaving, by coating the yarn with a starch based coating to prevent chafing or breaking during the weaving process. The slashing (sizing) and desizing shrinking processes are conventional. As an example, denim, after the desizing shrinking process, normally shrinks about 14–16% in the length and width. Thus, scrap denim, for use in the process according to the invention, has already shrunk its maximum amount. Therefore, after the scrap denim fibers and virgin cotton fibers are spun together, as per the process according to the invention, and after the resulting material is slashed (sized) and ran through the desizing shrinking process for better weaving, the only shrinkage that occurs is attributable to the 10–25% virgin fibers present in the resulting material. Accordingly, shrinkage of the resulting material is reduced to less than 2% in both the length and width directions. This results in a more useable material available from the resulting recycled material.

As shown in FIG. 2, with the process according to the invention, it is possible to entirely recycle a mass of scrap fiber leaving absolutely no waste. The smaller scrap materials and cotton dust, which are too small to be used in the spinning process according to the invention, can be accumulated by color, the same way as the larger scraps, and then mixed into paper pulp to create a colored paper. While the prior art has been limited to using only dry powdered indigo dye to color paper, because the recycling process according to the invention will be used with fabric scraps of all colors, it will be possible to make papers of any color. This can be used in paper products such as stationary or business cards. Therefore, it is possible to entirely recycle a mass of cloth scrap into other biodegradable products. Also, since cotton based papers are known to be of the highest quality and price, this process becomes even more advantageous when using colored cotton as the cloth scraps. Accordingly, it is expected that a recycler would have bins containing different colored large fabric on hand of both large sizes for recycling into new materials and small sizes and dust for use in making colored paper.

The above description is given in reference to a process for recycling cloth scraps. However, it is understood that many variations are apparent to one of ordinary skill in the art from a reading of the above specification and such variations are within the spirit and scope of the instant invention as defined by the following appended claims.

That which is claimed:

1. A method for recycling scrap cloth materials comprising the steps of:

moistening cloth scraps;

placing said cloth scraps into a shredding machine;

applying moisture to said scraps while said scraps are shredded by said shredding machine in order to maintain a predetermined level of moisture in said scraps;

opening said moist shredded cloth scraps into scrap fibers;

selecting premium variety virgin cotton fibers;

pre-gin contracting said premium variety virgin fibers;

opening and cleaning said premium variety virgin fibers; and blending, carding, drawing, and spinning 10–25% virgin fibers around 90–75% said scrap fibers.

2. The method according to claim 1, wherein said step of selecting premium variety virgin cotton fibers, comprises the step of selecting from among: Acala, American Egypt, Pima varieties, colored wool or cashmere.

3. The method according to claim 1, wherein said step of pre-gin contracting comprises:

using only one saw/grid bar cleaner at a speed of 800 RPM.

4. The method according to claim 1, wherein said step of moistening said cloth scraps comprises subjecting said scraps to a relative humidity of substantially 65–70% at atmospheric conditions for enough time to achieve an actual moisture content in said scraps of substantially 10%.

5. The method according to claim 4, wherein said step of applying moisture comprises applying a direct moisture spray inside the shredding machine.

6. The method according to claim 1, wherein said step of spinning comprises open end spinning.

7. The method according to claim 6, wherein said step of open end spinning applies a twist ratio of between 4.7 and 5.0 to said virgin fibers.

8. The method according to claim 1, wherein said cloth scraps are denim.

9. The method according to claim 1, wherein said cloth scraps are wool.

10. The method according to claim 1, wherein said cloth scraps are cut mohair.

11. The method according to claim 1, wherein said scrap fibers have a minimum fiber length of ¾".

12. The method according to claim 1, wherein said scrap fibers have a fiber length of ¾" to 29/32".

13. The method according to claim 1, wherein said cloth scraps are of one color and said virgin carrier fibers are of another color.

14. The method according to claim 1, wherein process results in a premium label ECO-type fabric.

15. A method for recycling scrap cloth materials, comprising the steps of:

moistening cloth scraps;

placing said cloth scraps into a shredding machine;

applying moisture to said scraps while said scraps are shredded by said shredding machine in order to maintain a predetermined level of moisture in said scraps;

opening said moist cloth scraps into scrap fibers;

selecting premium variety virgin cotton fibers;

pre-gin contracting said premium variety virgin fibers;

opening and cleaning said premium variety virgin fibers; and blending, 10–25% virgin fibers with 90–75% said scrap fibers.

* * * * *